(12) United States Patent
Taylor

(10) Patent No.: US 7,090,000 B2
(45) Date of Patent: Aug. 15, 2006

(54) HEAT RECOVERY VENTILATOR

(75) Inventor: Wayne Taylor, Peterborough (CA)

(73) Assignee: Trent Metals Limited, (CA)

( * ) Notice: Subject to any disclaimer, the term of this patent is extended or adjusted under 35 U.S.C. 154(b) by 345 days.

(21) Appl. No.: 10/712,681

(22) Filed: Nov. 13, 2003

(65) Prior Publication Data

US 2005/0103464 A1    May 19, 2005

(51) Int. Cl.
*F28F 27/02*    (2006.01)

(52) U.S. Cl. .................. 165/103; 165/54; 165/11.1

(58) Field of Classification Search ............. 165/103, 165/11.1, 54, 4
See application file for complete search history.

(56) References Cited

U.S. PATENT DOCUMENTS

| | | | | |
|---|---|---|---|---|
| 5,024,263 | A * | 6/1991 | Laine et al. | ............... 165/283 |
| 6,176,305 | B1 * | 1/2001 | Haglid | ............... 165/231 |
| 6,450,244 | B1 * | 9/2002 | Bassilakis | ............... 165/4 |
| 2002/0017107 | A1 * | 2/2002 | Bailey et al. | ............... 165/54 |
| 2003/0070787 | A1 * | 4/2003 | Moffitt | ............... 165/4 |

FOREIGN PATENT DOCUMENTS

| | | |
|---|---|---|
| CA | 2059195 | 1/1992 |
| CA | 2134168 | 10/1994 |
| CA | 2140232 | 1/1995 |
| CA | 2388527 | 5/2002 |

* cited by examiner

*Primary Examiner*—Teresa J. Walberg
(74) *Attorney, Agent, or Firm*—Harness, Dickey & Pierce, P.L.C.

(57) ABSTRACT

A heat recovery ventilator is provided which includes a heat exchanger having discrete inlet and exhaust passageways extending therethrough for providing heat transfer between respective fluids flowing along the inlet and the exhaust passages. The inlet passageway provides fluid communication between a supply inlet plenum and a supply discharge plenum. The outlet passageway provides fluid communication between an exhaust inlet plenum and an exhaust discharge plenum. The supply inlet plenum has a supply port for admitting supply air into the supply inlet plenum. The exhaust discharge plenum has an exhaust port for discharging air from the exhaust discharge plenum. A transfer port extends between the supply inlet plenum and the exhaust discharge plenum for providing fluid communication therebetween. A flow diverter is associated with the transfer port and is movable between a venting configuration closing the transfer port to allow fluid flow through the exhaust discharge port and a defrost configuration closing the exhaust discharge port to open the transfer port.

15 Claims, 6 Drawing Sheets

HEAT RECOVERY VENTILATOR

FIELD OF THE INVENTION

This invention relates to air exchange ventilators for admitting fresh air into an enclosure while exhausting stale air. More particularly, this invention relates to such ventilators which include a heat exchanger to extract heat from the stale air and transfer it to the fresh air. Still more particularly, this invention relates to defrost arrangements for such ventilators.

BACKGROUND OF THE INVENTION

Highly energy efficient buildings are generally designed to avoid uncontrolled ingress or egress of air. As some air exchange is necessary to remove stale air and replace it with fresh air, it is desirable to first remove heat from the stale air to avoid losing the heat with the air. A heat recovery ventilator is used for this purpose.

A heat recovery ventilator includes a heat exchanger with two discrete air passageways, one for stale air exhaust and the other for fresh supply air. As the exhaust air passes out of the enclosure through the heat exchanger, it gives up its heat to the fresh supply air entering the enclosure through the heat exchanger. Accordingly the heat is "recovered" in the ventilator during the ventillation process and hence the name "heat recovery" ventilator.

A problem occurs with heat recovery ventilators in situations where the fresh supply air is at below freezing temperatures. As the stale air generally contains moisture, once it passes up heat, the moisture will freeze in the stale air exhaust passageway. Eventually ice build-up will block the passageway preventing the exhausting of stale air.

Different mechanisms have been proposed in order to defrost the ventilator, for example, as disclosed in Canadian Patent No. 2,059,195 and Canadian Patent No. 2,140,232. According to the latter, two actuators and respective valves or flaps are used to close the exhaust outlet and fresh supply air inlet. Stale air is thereby redirected to return back through the fresh supply air passageway to defrost the stale exhaust air passageway. This is carried out periodically, typically before the passageways totally freeze up. A drawback to this arrangement is the cost and complexity associated with utilizing two actuators each controlling separate valves or flaps.

The former patent suggests that instead of having two actuators it is possible to block the cold supply inlet and divert stale air exhaust back through the fresh supply air passages in the heat exchanger. While this does eliminate a valve or flap and an actuator it does present its own problems. As the actuator and flaps are disposed adjacent the cold supply there is a possibility of their freezing, thereby rendering them inoperable. Furthermore while the fresh air supply is closed stale air is recirculated. It would be preferable if the unit were capable of admitting at least some fresh supply air to commingle with the stale air.

SUMMARY OF THE INVENTION

A heat recovery ventilator is provided which includes a heat exchanger having discrete inlet and exhaust passageways extending therethrough for providing heat transfer between respective fluids flowing along the inlet and the exhaust passages. The inlet passageway provides fluid communication between a supply inlet plenum and a supply discharge plenum having a supply discharge port for discharging supply air. The outlet passageway provides fluid communication between an exhaust inlet plenum having an exhaust inlet port and an exhaust discharge plenum. The supply inlet plenum has a supply port for admitting supply air into the supply inlet plenum. The exhaust discharge plenum has an exhaust port for discharging air from the exhaust discharge plenum. A transfer port extends between the supply inlet plenum and the exhaust discharge plenum for providing fluid communication therebetween. A flow diverter is associated with the transfer port and is movable between a venting configuration closing the transfer port to allow fluid flow through the exhaust discharge port and a defrost configuration closing the exhaust discharge port to open the transfer port.

The exhaust passageway may include a plurality of individual adjacent passageways through the heat exchanger. Furthermore the inlet passageway may include a plurality of individual adjacent passageways through the heat exchanger.

The supply inlet plenum, supply discharge plenum, exhaust inlet plenum and exhaust discharge plenum may be at least partially defined by a housing containing the heat exchanger.

Fluid flow along the exhaust passageway may be augmented by an exhaust fan mounted within either the exhaust inlet plenum or the exhaust discharge plenum.

Fluid flow along the inlet passageway may be augmented by a supply discharge fan mounted within the supply discharge plenum. The exhaust inlet and supply discharge fans may be of similar capacity.

The exhaust inlet and discharge fans may share a common fan motor.

The heat recovery ventilator may further have an actuator operably connected to the flow diverter for moving the flow diverter between its venting and discharge configurations.

The actuator may communicate with a controller which causes the actuator to move.

DESCRIPTION OF DRAWINGS

Preferred embodiments of the invention are described below with reference to the accompanying drawings in which.

DESCRIPTION OF PREFERRED EMBODIMENTS

Figure 1:
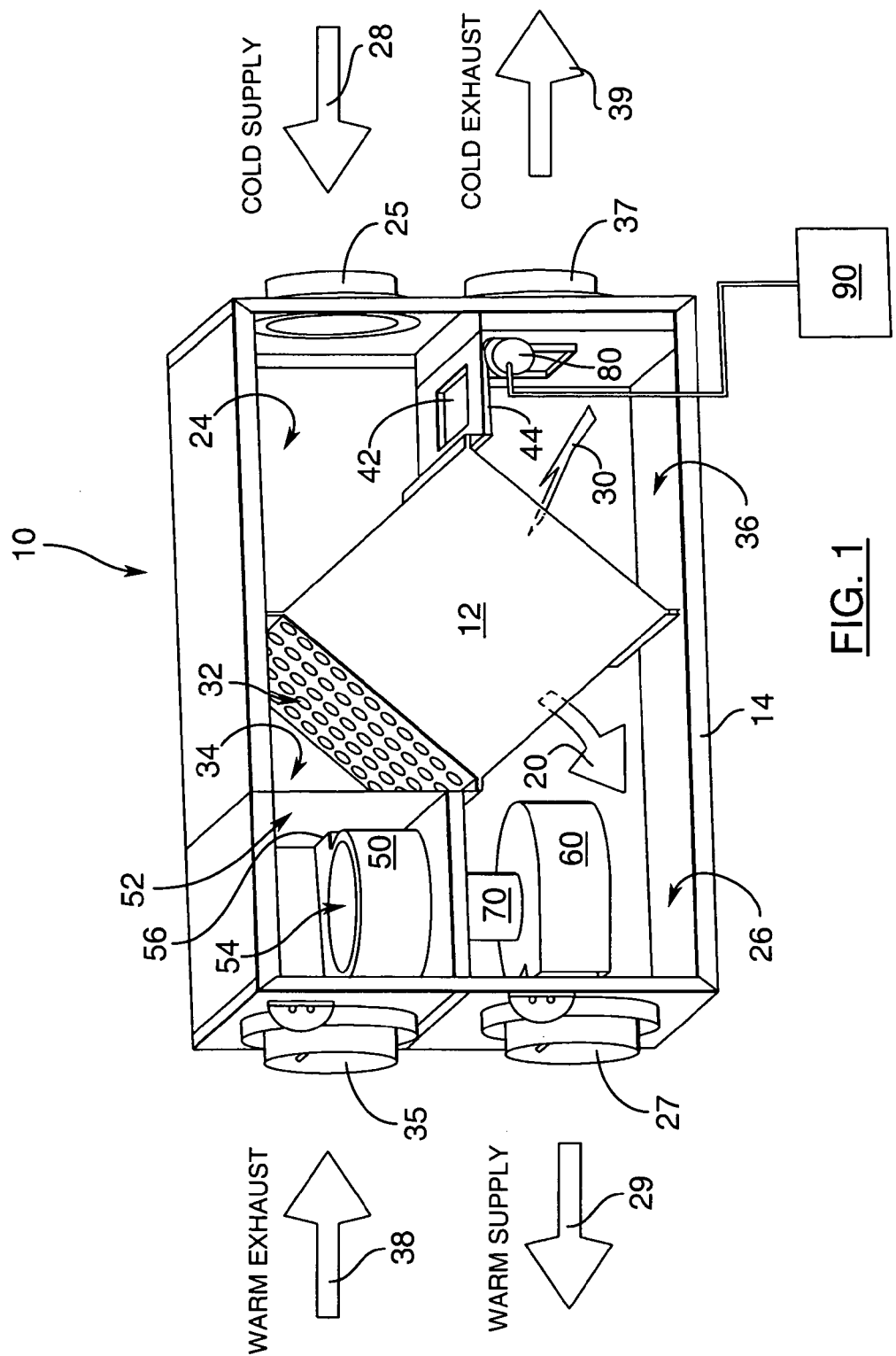
FIG. 1 is a perspective view of an interior of a heat recovery ventilator according to the present invention in the ventilation mode.

A heat recovery ventilator according to the present invention is generally indicated by reference 10 in the accompanying illustrations. At the core of the heat recovery ventilator 10 is a heat exchanger 12 having an inlet passageway schematically illustrated by arrow 20 and an exhaust passageway schematically illustrated by arrow 30. A housing 14 defines an exterior of the heat recovery ventilator 10. It will be appreciated that the actual unit will have a front cover which is not shown in FIGS. 1 and 2 to show its interior.

The inlet passageway 20 and exhaust passageway 30 are "discrete" in that they allow heat transfer between respective fluids flowing therealong without allowing commingling of the fluids. As is common with air to air heat exchangers, at least one of the inlet passageway 20 and exhaust passageway 30 may comprise a plurality of individual passageways, such as shown at reference 32. This maximizes the surface area to enhance heat transfer.

The inlet passageway provides fluid communication between a supply inlet plenum 24 and a supply discharge plenum 26. The outlet passageway provides fluid communication between the exhaust inlet plenum 34 and exhaust discharge plenum 36.

The supply inlet plenum has a supply port 25 for admitting supply air 28 (typically "outside" air) into the supply inlet plenum 24.

The supply discharge plenum 26 has a supply discharge port 27 for discharging air 29 which has passed through the heat exchanger 12 from the heat recovery ventilator 10 into an enclosure.

The exhaust discharge plenum 36 has an exhaust port 37 for discharging exhaust air 39 from the exhaust discharge plenum 36. The exhaust inlet plenum 34 has an exhaust inlet port 35 for admitting warm air 38 from an enclosure into the exhaust inlet plenum 34.

A dividing wall 40 separates the supply inlet plenum 24 from the exhaust discharge plenum 36. A transfer port 42 extends between the supply inlet plenum 24 and the exhaust discharge plenum 36 to provide fluid communication therebetween in a discharge mode.

A flow diverter 44 such as the movable flap illustrated is associated with the transfer port 42 for example by being mounted to the dividing wall 40 or the housing 14 which contains the heat exchanger 12 and at least partially defines the supply inlet, supply discharge, exhaust inlet and exhaust discharge plenums 24, 26, 34 and 36 respectively. The flow diverter 44 is movable between a venting configuration illustrated in FIG. 1 and a defrost configuration illustrated in FIG. 2. In the venting configuration the flow diverter 44 closes the transfer port 42 and opens the exhaust discharge port 37 and allows fluid flow (i.e. exhaust air 39) to flow through the exhaust discharge port 37. In the defrost configuration the flow diverter 44 opens the transfer port 42 and closes the exhaust discharge port 37 to cause air from the exhaust discharge plenum 36 to be transferred to the supply inlet plenum 24.

Figure 2:
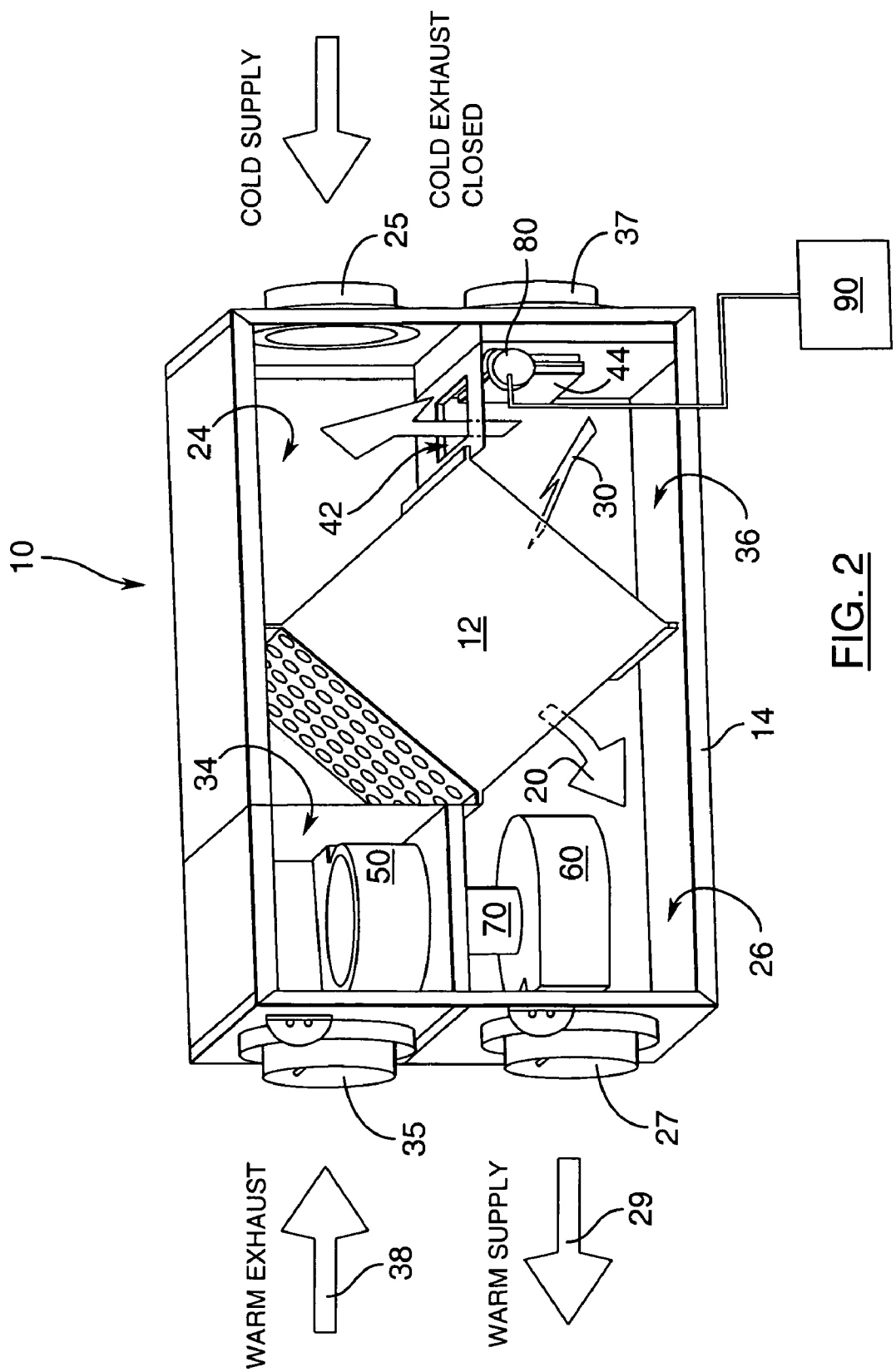
FIG. 2 is a view corresponding to FIG. 1 but showing the heat recovery ventilator in a defrost mode.

In order to augment air flow along the exhaust passageway 30, an exhaust fan 50 may be mounted within the exhaust inlet plenum 34. If a centrifugal type of fan is utilized as illustrated in FIGS. 1 and 2, appropriate partitioning such as provided by partition wall 52 or suitable ducting will be required to separate an inlet 54 of the fan 50 from a fan outlet 56. In this manner a pressure differential may be maintained across the exhaust inlet plenum 34.

To augment air flow along the inlet passageway 20, a supply discharge fan 60 may be mounted within the supply discharge plenum 26 to cause a pressure gradient across the supply discharge plenum 26 between the heat exchanger 12 and the supply discharge port 27.

Providing an exhaust fan 50 and a supply discharge fan 60 within the housing 14 is desirable in order to make the heat recovery ventilator 10 a "stand alone" unit. It will however be appreciated that external fans might also be connected to the inlet port 35 and supply discharge port 27.

If an exhaust fan 50 and a supply discharge fan 60 are provided, these should be of similar capacity and may be arranged as illustrated to share a common fan motor 70. In this manner air flow through the inlet passageway 20 will balance air flow through the exhaust passageway 30 to substantially avoid unwanted pressure differentials between an outside and an inside of an enclosed space utilizing the heat recovery ventilator 10.

Figure 5:
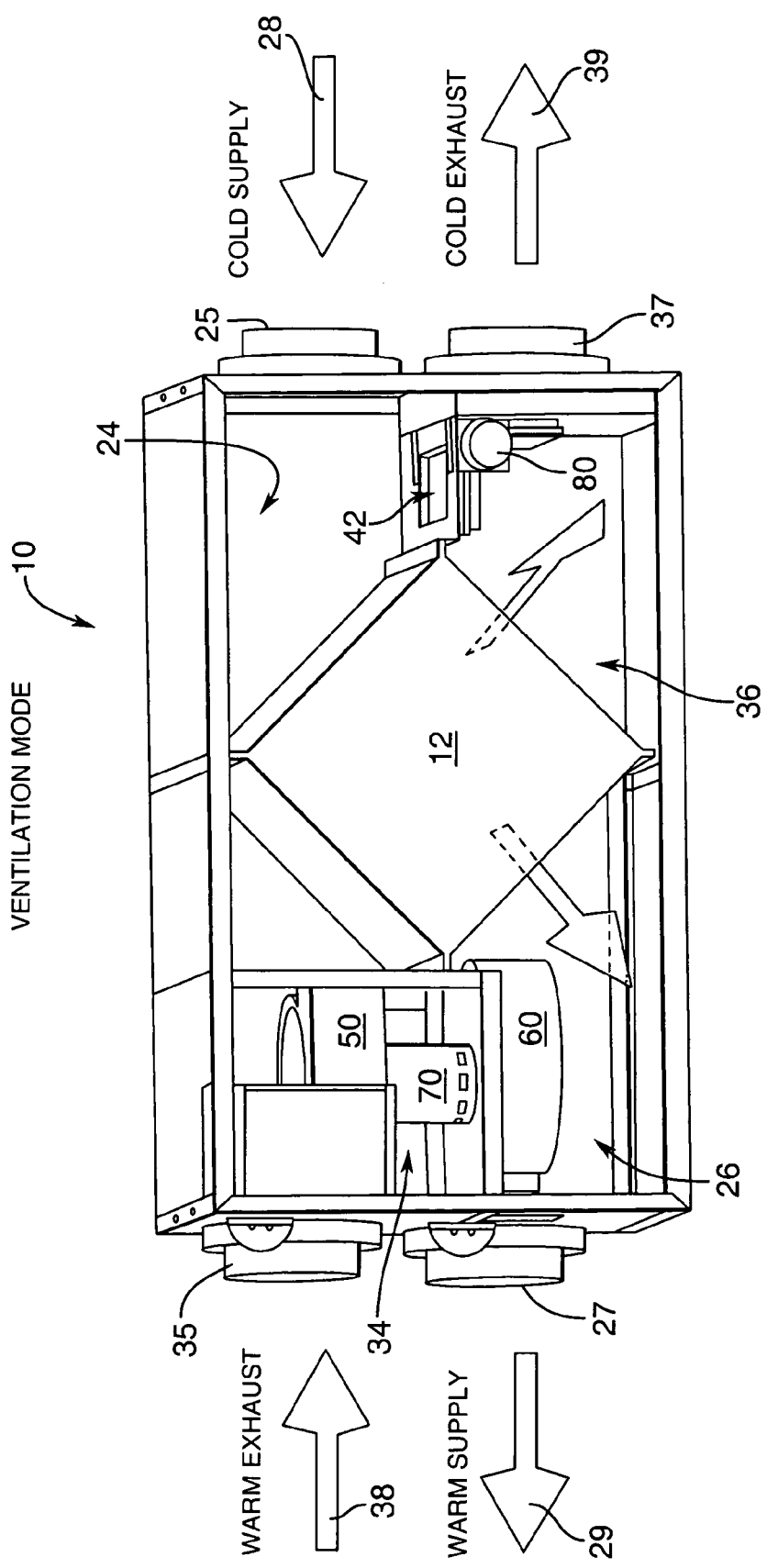
FIG. 5 is a perspective view corresponding to FIG. 1 but illustrating an alternative fan motor placement and shown in a ventilation mode; and, FIG. 6 is a view corresponding to FIG. 5 but illustrating the ventilator in a defrost mode.
Figure 6:
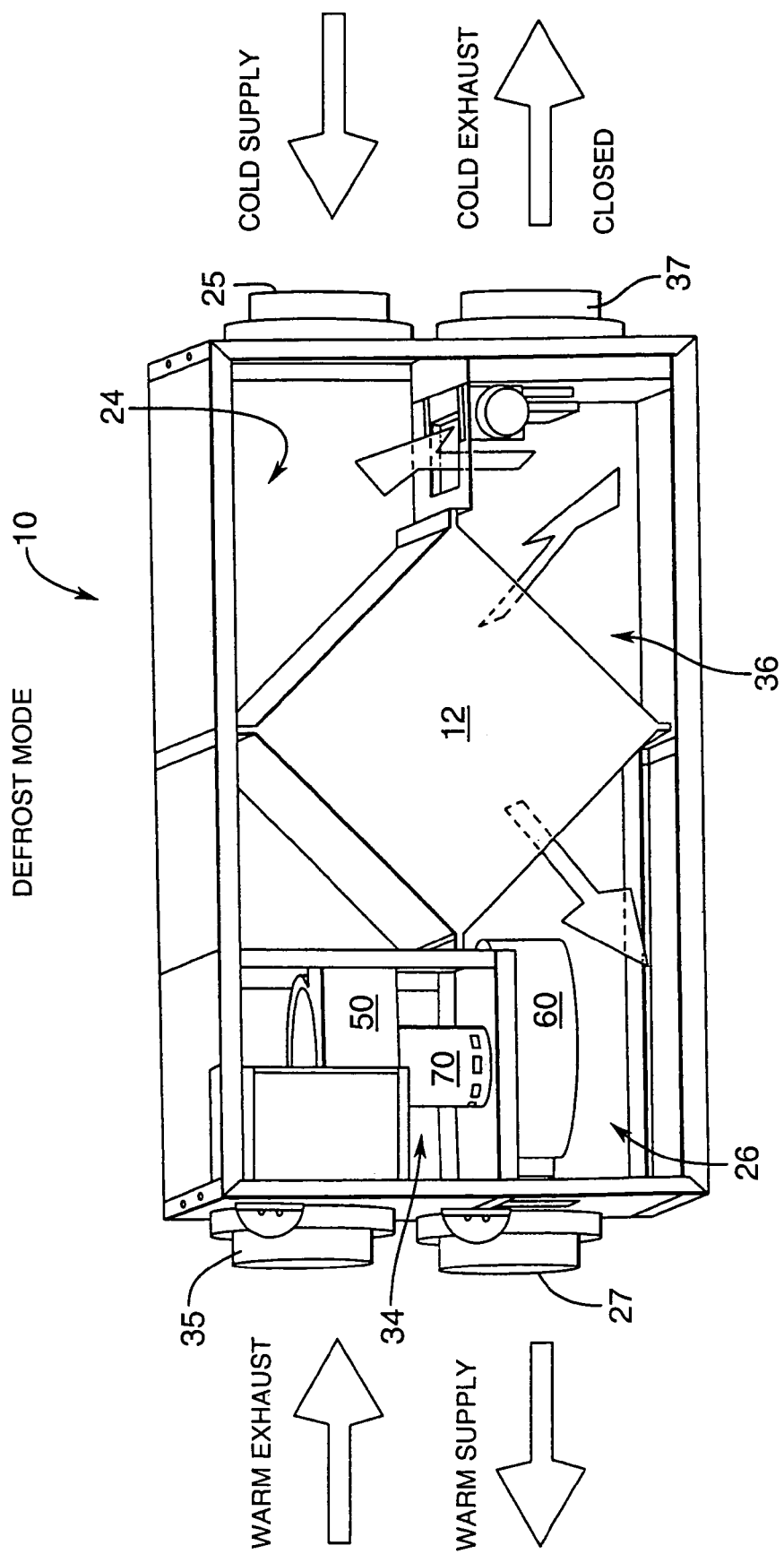

In the embodiment illustrated in FIGS. 1 and 2, the fan motor 70 is shown in the supply discharge plenum 26. Alternatively, as illustrated in FIGS. 5 and 6, the fan motor 70 may be mounted in the exhaust inlet plenum 34. Performance testing has indicated that improvements in efficiency may be realized by the latter arrangement wherein the fan motor is in the exhaust air stream rather than in the supply air stream.

An actuator 80 such as a servomotor may be operably connected to the flow diverter 44 to cause it to move between its venting and defrost configurations. Other arrangements may also be utilized such as fluid pressure actuated cylinders. A controller 90 may be connected so as to communicate with the actuator 80 to cause the actuator to move. The controller 90 may take a variety of forms and for example may be a timer or alternatively may sense temperature or air flow within various parts of the heat recovery ventilator 10.

In operation, when the heat recovery ventilator 10 is in its ventilation mode as illustrated in FIG. 1, warm exhaust air 38 enters the inlet port 35, follows the exhaust passageway 30 and is exhausted through the exhaust port 37. Simultaneously cold supply air 28 is drawn into the supply inlet port 25, follows the inlet passageway 20 and is discharged through the supply discharge port 27. In passing through the heat exchanger 12, heat from the warm exhaust air 38 is transferred to the cold supply air 28.

In its defrost mode as illustrated in FIG. 2, the exhaust port 37 is closed and the transfer port 42 opened to cause the warm exhaust air 38 to enter the inlet passageway 20 in lieu of cold supply air 28 thereby heating the heat exchanger 12 to cause any accumulated ice to melt.

As the flow diverter 44 and the actuator 80 are within the exhaust discharge plenum 36 they are typically in a non-freezing environment which might not be the case were they mounted in the supply inlet plenum 24. Accordingly the possibility of failure of the heat recovery ventilator through freezing of the actuator 80 and flow diverter 44 is reduced.

Figure 3:
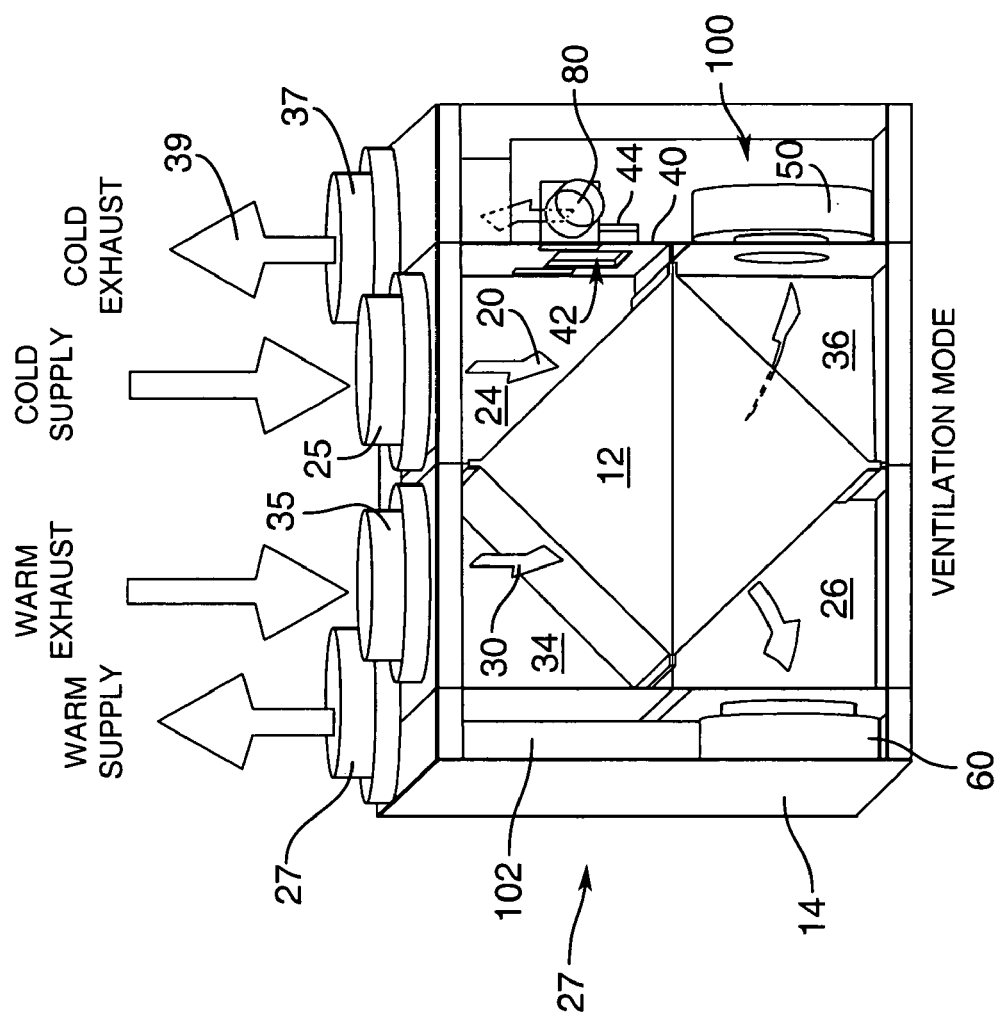
FIG. 3 is a perspective view of an interior of an alternate embodiment heat recovery ventilator according to the present invention in its ventilation mode.
Figure 4:
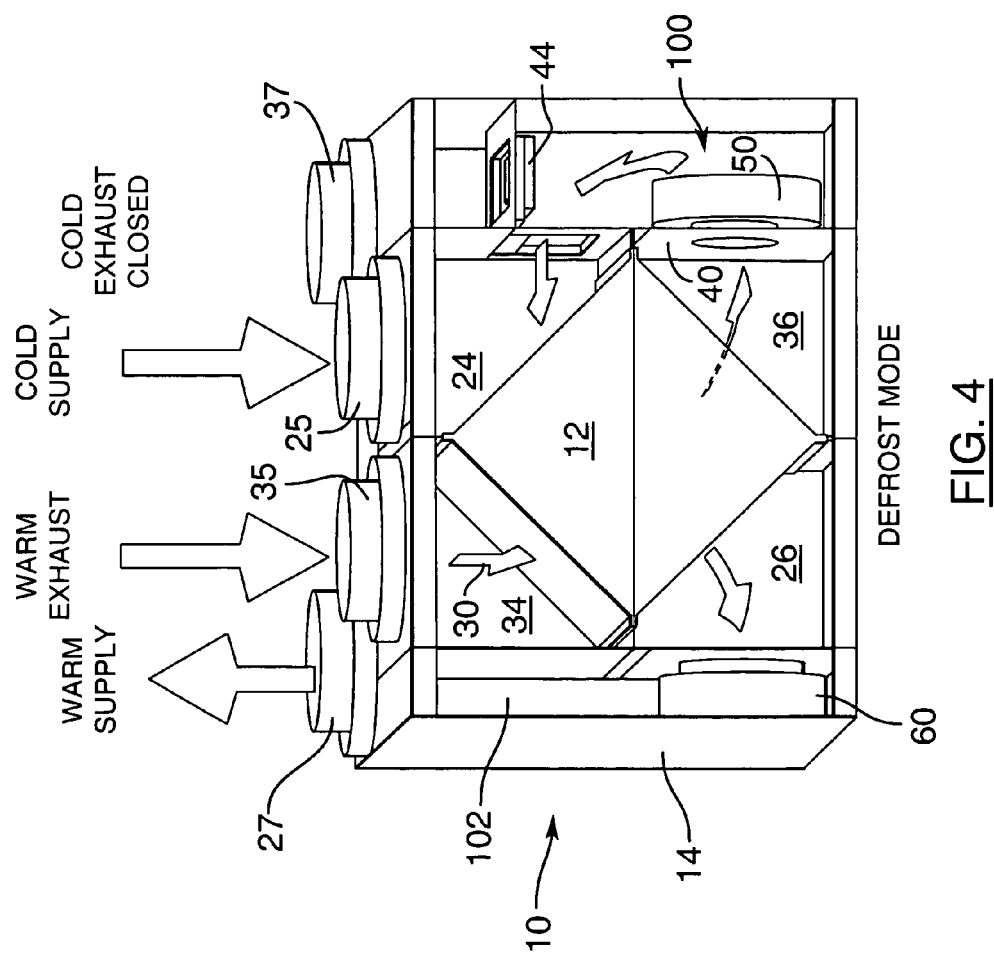
FIG. 4 is a view corresponding to FIG. 3 but showing the heat recovery ventilator in a defrost mode.

The FIGS. 3 and 4 embodiment is similar to the FIGS. 1 and 2 embodiment and accordingly the same reference numerals have been used as applicable. The FIGS. 3 and 4 embodiment differs from the FIGS. 1 and 2 embodiment principally in the fan ducting and placement and in port placement.

As illustrated in FIG. 3, the exhaust discharge plenum 36 includes an exhaust duct 100 which fluidly communicates with the exhaust discharge port 37. The transfer port 42 is mounted in this portion of the exhaust discharge plenum 36. Rather than mounting the exhaust fan 50 in the exhaust inlet plenum 34, it is mounted in the exhaust duct portion 100 of the exhaust discharge plenum 36. Accordingly the exhaust fan 50 draws rather than pushes warm exhaust air through the heat exchanger 12.

The use of the supply discharge fan 60 is similarly mounted in a supply discharge duct 102 which forms a continuation of the supply discharge plenum 26 and extends to the supply discharge port 27. As with the FIGS. 1 and 2 embodiment the supply discharge fan 60 draws either cold supply air (ventilation mode—FIG. 3) or warm exhaust air (exhaust mode—FIG. 4) through the inlet passageway of the heat exchanger 12. In either case it discharges through the supply discharge port 27.

The use of the supply discharge duct 102 and exhaust duct 100 allows the supply port 25, supply discharge port 27, exhaust inlet port 35 and exhaust port 37 to all be on a common side of the heat recovery ventilator 10. Initial testing has shown the FIGS. 3 and 4 embodiment to have better heat recovery efficiency than the FIGS. 1 and 2 embodiment.

The above description is intended in an illustrative rather than a restrictive sense. Variations may be apparent to those skilled in such apparatus without departing from the spirit and scope of the invention as defined by the claims set out below. For example although the unit has been described for use with air, the same principles might find application for use with other fluids.

The invention claimed is:

1. A heat recovery ventilator comprising:
   a heat exchanger having discrete inlet and exhaust passageways extending therethrough for providing heat transfer between respective fluids flowing along said inlet and said exhaust passageways;
   said inlet passageway providing fluid communication between a supply inlet plenum and a supply discharge plenum having a supply discharge port for discharging supply air;
   said exhaust passageway providing fluid communication between an exhaust inlet plenum having an exhaust inlet port and an exhaust discharge plenum;
   said supply inlet plenum having a supply port for admitting supply air into said supply inlet plenum;
   said exhaust discharge plenum having an exhaust port for discharging exhaust air from said exhaust discharge plenum;
   a transfer port between said supply inlet plenum and said exhaust discharge plenum for selectively providing fluid communication therebetween; and,
   a flow diverter associated with said transfer port and movable between a venting configuration in which said flow diverter covers and closes said transfer port and opens and allows fluid flow through said exhaust discharge port and a defrost configuration in which said flow diverter covers and closes said exhaust discharge port and opens and allows fluid flow through said transfer port.

2. A heat recovery ventilator as claimed in claim 1 wherein at least one of said inlet exhaust passageways includes a plurality of individual adjacent passageways.

3. A heat recovery ventilator as claimed in claim 2 wherein said supply inlet plenum, supply discharge plenum, exhaust inlet plenum and exhaust discharge plenum are at least partially defined by a housing containing said heat exchanger.

4. A heat recovery ventilator as claimed in claim 3 wherein fluid flow along said exhaust passageway is augmented by an exhaust fan mounted within one of said exhaust inlet plenum and said exhaust discharge plenum.

5. A heat recovery ventilator as claimed in claim 4 wherein fluid flow along said inlet passageway is augmented by a supply discharge fan mounted within said supply discharge plenum.

6. A heat recovery ventilator as claimed in claim 5 wherein said exhaust and said supply discharge fans are of similar capacity.

7. A heat recovery ventilator as claimed in claim 6 wherein said exhaust and supply discharge fans share a common fan motor.

8. A heat recovery ventilator as claimed in claim 7 further having an actuator operably connected to said flow diverter for moving said flow diverter between said venting and said defrost configurations.

9. A heat recovery ventilator as claimed in claim 8 wherein said actuator communicates with a controller which causes said actuator to move.

10. A heat recovery ventilator as claimed in claim 9 wherein fluid flow along said exhaust passageway is augmented by an exhaust fan mounted within said exhaust discharge plenum.

11. A heat recovery ventilator as claimed in claim 10 wherein said supply discharge fan is mounted in a supply discharge duct portion of said supply discharge plenum which extends to said supply discharge port and said exhaust fan is mounted in an exhaust discharge duct portion of said exhaust discharge plenum which extends to said exhaust port.

12. A heat recovery ventilator as claimed in claim 11 wherein said supply discharge, exhaust inlet and exhaust ports are all on a common side of said heat recovery ventilator.

13. A heat recovery ventilator as claimed in claim 7 wherein said fan motor is mounted within said exhaust inlet plenum.

14. A heat recovery ventilator as claimed in claim 9 wherein said fan motor is mounted in said exhaust inlet plenum.

15. A heat recovery ventilator comprising:
   a housing including a supply input plenum, a supply discharge plenum, an exhaust input plenum, and an exhaust discharge plenum, said supply inlet plenum having a supply port defined in said housing for admitting supply air, said supply discharge plenum having a supply discharge port defined in said housing for discharging said supply air, said exhaust inlet plenum having an exhaust inlet port defined in said housing for admitting exhaust air, said exhaust discharge plenum having an exhaust port defined in said housing for discharging exhaust air from said exhaust discharge plenum;
   a heat exchanger disposed within said housing and having discrete inlet and exhaust passageways extending therethrough, said inlet and exhaust passageways providing heat transfer between respective fluids flowing therethrough, said inlet passageway providing fluid communication between said supply inlet plenum and said supply discharge plenum, said exhaust passageway providing fluid communication between said exhaust inlet plenum and said exhaust discharge plenum;
   a dividing wall disposed within said housing between said heat exchanger and said housing, said dividing wall separating said supply inlet plenum and said exhaust discharge plenum and having a transfer port defined therein, said transfer port selectively providing fluid communication between said supply inlet plenum and said exhaust discharge plenum; and,
   a flow diverter associated with said transfer port and said exhaust discharge port, said flow diverter including a single flap, said single flap movable between a venting configuration and a defrost configuration, said venting configuration closing said transfer port and opening and allowing fluid flow through said exhaust discharge port, said defrost configuration closing said exhaust discharge port and opening and allowing fluid flow through said transfer port.

* * * * *